(12) United States Patent
Chan

(10) Patent No.: US 8,218,397 B2
(45) Date of Patent: Jul. 10, 2012

(54) AUDIO SOURCE PROXIMITY ESTIMATION USING SENSOR ARRAY FOR NOISE REDUCTION

(75) Inventor: Kwokleung Chan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 358 days.

(21) Appl. No.: 12/603,824

(22) Filed: Oct. 22, 2009

(65) Prior Publication Data

US 2010/0103776 A1 Apr. 29, 2010

Related U.S. Application Data

(60) Provisional application No. 61/108,413, filed on Oct. 24, 2008.

(51) Int. Cl.
*G01S 3/80* (2006.01)
(52) U.S. Cl. ........................................................ 367/124
(58) Field of Classification Search .................. 367/124
See application file for complete search history.

(56) References Cited

U.S. PATENT DOCUMENTS

| | | | |
|---|---|---|---|
| 5,917,921 A | 6/1999 | Sasaki et al. | |
| 6,061,456 A | 5/2000 | Anrea et al. | |
| 6,549,630 B1 | 4/2003 | Bobisuthi | |
| 7,221,622 B2 | 5/2007 | Matsuo et al. | |
| 2005/0185813 A1 | 8/2005 | Sinclair et al. | |
| 2006/0256974 A1 | 11/2006 | Oxford | |
| 2007/0154031 A1 | 7/2007 | Avendano et al. | |
| 2008/0019548 A1 | 1/2008 | Avendano | |
| 2008/0152167 A1 | 6/2008 | Taenzer | |
| 2008/0175408 A1 | 7/2008 | Mukund et al. | |
| 2008/0317260 A1 * | 12/2008 | Short | 381/92 |
| 2010/0103776 A1 * | 4/2010 | Chan | 367/119 |

FOREIGN PATENT DOCUMENTS

| | | | |
|---|---|---|---|
| WO | WO2008089012 | | 7/2008 |
| WO | WO2010048490 | * | 4/2010 |

OTHER PUBLICATIONS

International Search Report & Written Opinion—PCT/US09/061807, International Search Authority—European Patent Office—Jan. 29, 2010.
Luckinbill, "Acoustic Proximity Detection Vox Employing Two Microphones" IP.COM Journal, IP.COM Inc., West Henrietta, NY, US, Mar. 26, 2002, XP013002483 ISSN: 1533-0001 figure 1.

* cited by examiner

*Primary Examiner* — Daniel Pihulic
(74) *Attorney, Agent, or Firm* — Espartaco Diaz Hidalgo

(57) ABSTRACT

Estimating the proximity of an audio source is accomplished by transforming audio signals from a plurality of sensors to frequency domain. The amplitudes of the transformed audio signals are then determined. The proximity of the audio source is determined based on a comparison of the frequency domain amplitudes. This estimation permits a device to differentiate between relatively distant audio sources and audio sources at close proximity to the device. The technique can be applied to mobile handsets, such as cellular phones or PDAs, hands-free headsets, and other audio input devices. Devices taking advantage of this "close proximity" detection are better able to suppress background noise and deliver an improved user experience.

33 Claims, 9 Drawing Sheets

AUDIO SOURCE PROXIMITY ESTIMATION USING SENSOR ARRAY FOR NOISE REDUCTION

CLAIM OF PRIORITY UNDER 35 U.S.C. §119

The present application for patent claims priority to Provisional Application No. 61/108,413 entitled "Estimation of Signal Proximity with a Sensor Array for Noise Reduction" filed Oct. 24, 2008, assigned to the same assignee hereof and which is incorporated herein by reference.

BACKGROUND

1. Field

The present disclosure pertains generally to audio signal processing, and more specifically, to near-field audio signal detection and noise suppression.

2. Background

Devices such as cellular phones, two-way radios and personal digital assistants (PDAs) that accept audio input are often used in adverse noise environments such as crowds, busy streets, restaurants, airports, vehicles or the like. Unwanted sounds generated from various sound sources within an audio environment, referred to as background noise, can emanate from differing locations within that audio environment. Common examples can include, but are not limited to, automobile noises or other voices within a crowded public place. Regardless of the source, the inability to distinguish a desired audio signal from background noise can result in audio input signals having decreased quality.

Strong background noise in these environments can obscure a user's speech and make it difficult to understand what the person is saying. In many cases, noise corrupts a speech signal and hence significantly degrades the quality of the desire audio signal. In cellular phones, for example, a person conversing in a noisy environment, like a crowded cafe or a busy train station, might not be able to converse properly as the noise corrupted speech perceived by a listener on the other end of a call is less intelligible. In all such cases of audio corruption, improving the quality of transmitted audio by suppressing background noise is desirable.

While noise filtering systems have been developed that attempt to remove background noise, these systems have not been able to remove all of the noise in all environments. Thus, there is a need for an improved technique of detecting and suppressing background noise.

SUMMARY

Disclosed herein is an improved technique for suppressing background noise received by an audio input device. The technique permits an audio input device to differentiate between relatively distant noise sources and sound originating at close proximity to the device. The technique can be applied to mobile handsets, such as cellular phones or PDAs, hands-free headsets, and other audio input devices. Audio input devices taking advantage of this "close proximity" detection are better able to suppress background noise and deliver an improved user experience.

According to an aspect, a method of determining the proximity of an audio source includes transforming audio signals from a plurality of sensors to frequency domain. The amplitudes of the transformed audio signals are then determined. The proximity of the audio source is determined based on a comparison of the amplitudes.

According to another aspect, a method of determining the proximity of an audio source includes receiving audio signals from a plurality of sensors and transforming the audio signals to frequency domain. The amplitudes of the transformed audio signals are determined at a plurality of frequencies. For each frequency, a differential signal is determined by comparing the spectral amplitudes from the different sensor at the frequency. This produces a plurality of differential signals. The proximity of the audio source is determined based on the differential signals.

According to another aspect, an apparatus includes a plurality of audio sensors outputting a plurality of audio signals in response to an audio source. A processor included in the apparatus is configured to transform the audio signals to frequency domain and to also determine the proximity of the audio source by comparing amplitudes of the transformed audio signals.

According to another aspect, an apparatus includes means for transforming a plurality of audio signals from a plurality of sensors to frequency domain; means for determining amplitudes of the transformed audio signals; means for comparing the amplitudes; and means for determining the proximity of the audio source based on the comparison of the amplitudes.

According to a further aspect, a computer-readable medium, embodying a set of instructions executable by one or more processors, includes code for transforming a plurality of audio signals from a plurality of sensors to frequency domain; code for determining amplitudes of the transformed audio signals; code for comparing the amplitudes; and code for determining the proximity of the audio source based on the comparison of the amplitudes.

Other aspects, features, and advantages will be or will become apparent to one with skill in the art upon examination of the following figures and detailed description. It is intended that all such additional features, aspects, and advantages be included within this description and be protected by the accompanying claims.

BRIEF DESCRIPTION OF THE DRAWINGS

It is to be understood that the drawings are solely for purpose of illustration. Furthermore, the components in the figures are not necessarily to scale, emphasis instead being placed upon illustrating the principles of the techniques described herein. In the figures, like reference numerals designate corresponding parts throughout the different views.

DETAILED DESCRIPTION

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

The word "exemplary" is used throughout this disclosure to mean "serving as an example, instance, or illustration." Anything described herein as "exemplary" is not necessarily to be construed as preferred or advantageous over other approaches or features.

Figure 1:
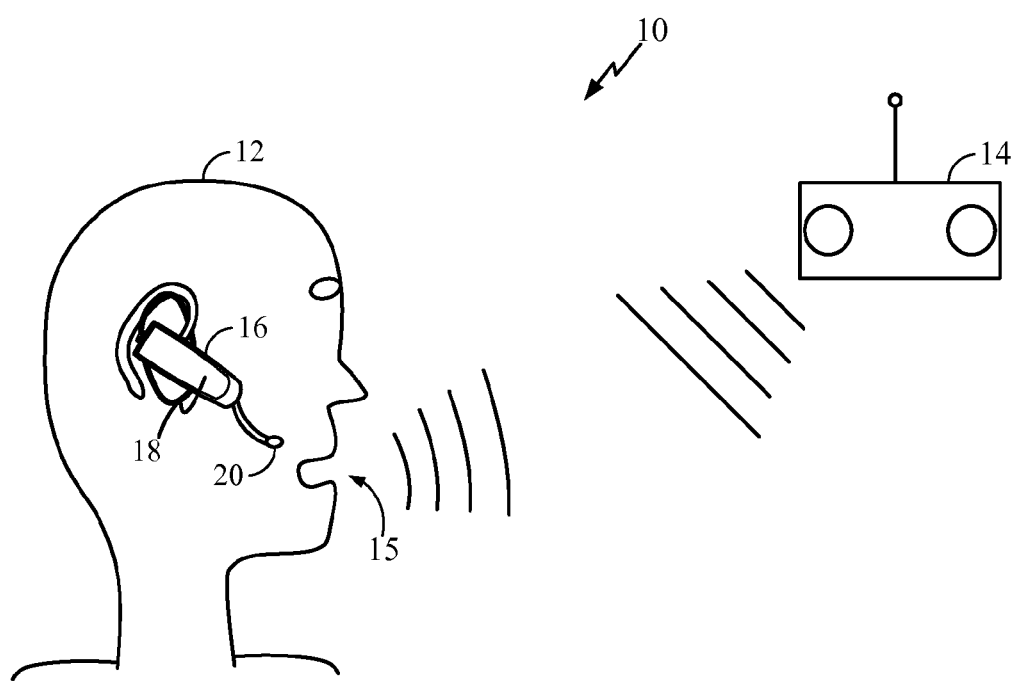
FIG. 1 is a diagram of an exemplary audio environment including a near-field audio source and a far-field background audio source.

FIG. 1 is a diagram of an exemplary audio environment 10 including an audio input device such as a headset 16, a near-field audio source 15 such as the mouth of a user 12, and a far-field background audio source 14, such as a radio. The headset 16 is subjected to the near-field audio source 15 and far-field audio source 14. The far-field audio source 14 is located farther away from the audio input device than the near-field audio source 15. Each of the audio sources 14, 15 can be anything that emits sounds.

The headset 16 uses a sensor array to estimate the proximity of the audio sources 14, 15 and thereafter control a noise reduction module included in the headset 16 to suppress audio signals classified as far-field. In the example shown, the sensor array includes a first audio sensor 18 and second audio sensor 20 included in the headset 16. The audio sensors 18, 20 are spaced apart, for example, they may by 2-4 cm apart. The audio sensors 18, 20 can be microphones or any other suitable audio transducer responsive to sound input. At nominal wearing position, the first audio sensor 18 is closer to the user's mouth than the second audio sensor 20. As a result, audio signals originating from the user's mouth that are picked up by the first audio sensor 18 are louder than the same signal picked up by second audio sensor 20. The magnitude difference between the detected audio signals can range from 1 dB to 3 dB or more, depending on the relative distance from the mouth to the audio sensors 18, 20. In addition, the signal level difference is signal frequency dependent. Typically, higher signal frequency gives a higher signal level difference because of the diffraction effect. With respect to the far-field audio source 14, since the audio sensors 18, 20 are close to each other relative to the distance from the far-field source 14, they pickup the far-field audio at roughly the same amplitude level, irrespective of the direction of arrival of the far-field audio. As a result, the headset 16 monitors and compares the signal amplitude levels at the two audio sensor 18, 20 to estimate the audio source proximity.

The exemplary headset 16 includes an earpiece body 17 and at least one support 19, such as an ear hanger, for allowing the headset 16 to be comfortably worn by the user 12. A boom 21 can also be included in the headset 16 for placing the first audio sensor 18 closer to the user's mouth. The second audio sensor 20 can be included in the earpiece body 17, as shown. In the example shown, the headset 16 is a wireless headset, such as a Bluetooth headset, in which audio signals between one or more devices and the headset 16 are carried over one or more wireless radio frequency (RF) or infrared (IR) channels.

If implemented as a Bluetooth wireless headset, the headset 16 can include components and functionality as defined by the Bluetooth Specification available at www.bluetooth.com. The Bluetooth Specification provides specific guidelines for providing wireless headset functionality. Alternatively, the headset 16 may be a wired headset, having a conductor carrying audio signals between a device and the headset 16.

Although the audio input device is illustrated as the headset 16, the audio source proximity estimation and noise suppression techniques and devices disclosed herein may also be included in other audio input devices, such as communication devices, e.g., phones, cellular phones, PDAs, video game, voice-activated remotes, live reporting systems, public address systems or the like. An audio input device is a device that receives sound.

Figure 2:
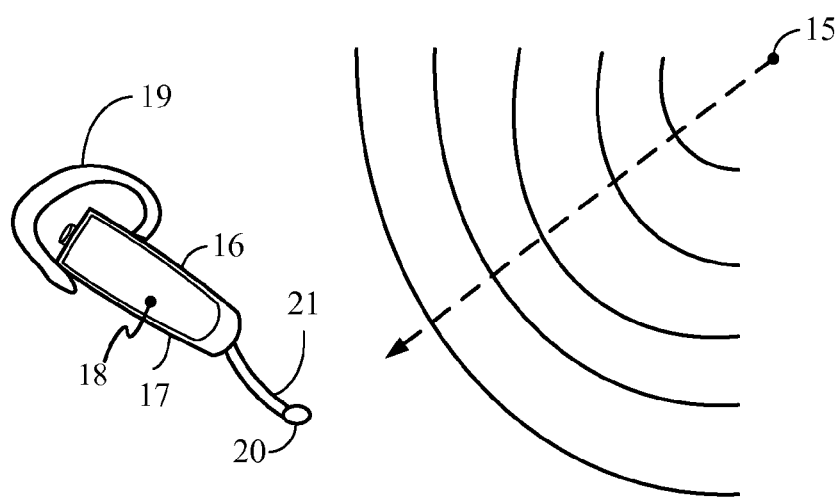
FIG. 2 is a diagram conceptually illustrating sound waves emitted from a near-field audio source.

FIG. 2 is a diagram conceptually illustrating the headset 16 subjected to sound waves emitted from the near-field audio source 15. Since the first audio sensor 18 is relatively close to the audio source 15 than the second audio sensor 20, the amplitude of the sound received at the sensors 18, 20 from the source 15 is measurably different. This difference in sensor amplitudes is exploited by the headset 16 to determine whether an audio source is near or distant to the headset 16.

Figure 3:
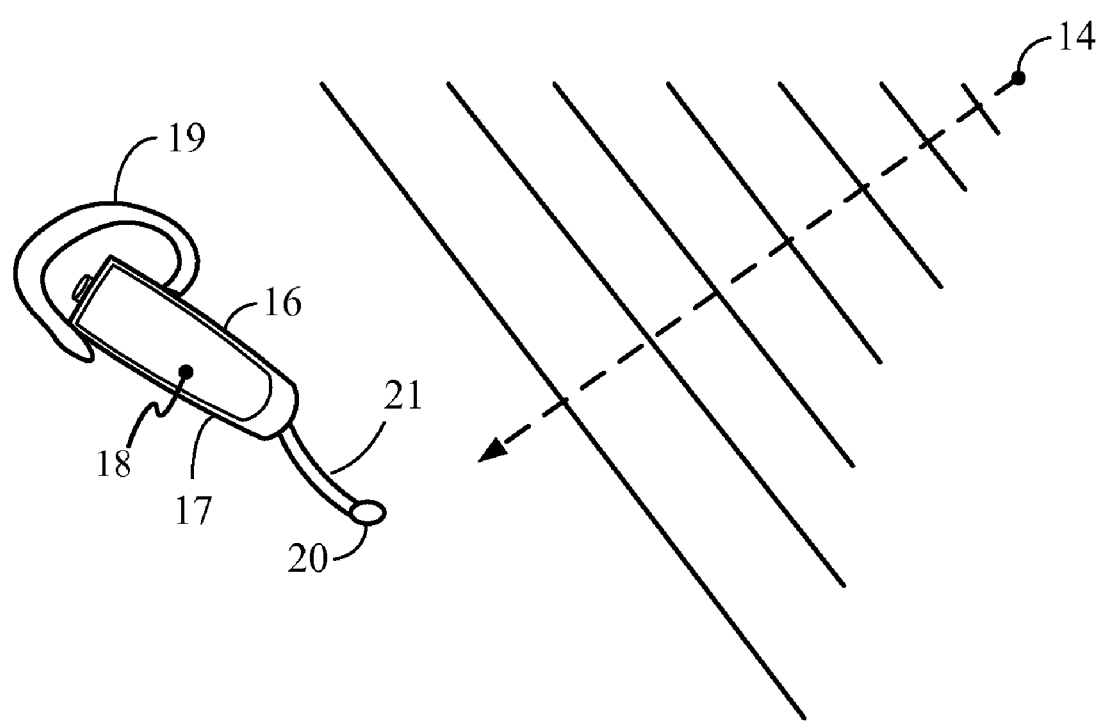
FIG. 3 is a diagram conceptually illustrating sound waves emitted from a far-field audio source.

FIG. 3 is a diagram conceptually illustrating the headset 16 subjected to sound waves emitted from a far-field audio source 14. Since the audio sensors 18, 20 are close to each other relative to the distance from the far-field audio source 14, they pickup the audio at roughly the same amplitude level, irrespective of the direction of arrival of the audio signal. As a result, a system which monitors the signal levels received by the two sensors 18, 20 is able to estimate the audio source proximity.

Figure 4:
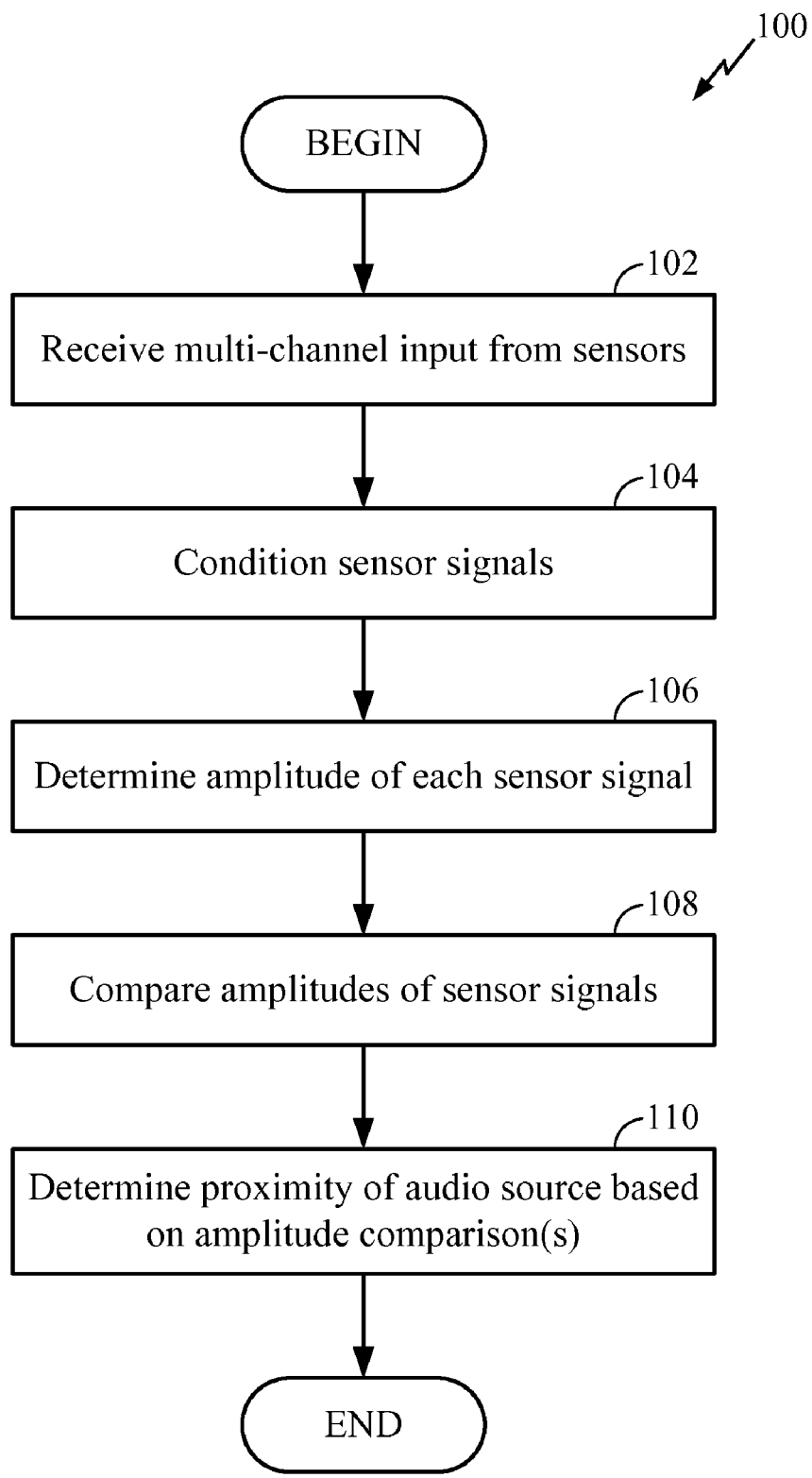
FIG. 4 is a flowchart illustrating a method of determining the proximity of an audio source by comparing signal amplitude from different audio sensors.

FIG. 4 is a flowchart 100 illustrating a method for estimating audio source proximity based on the audio signal levels at the sensor array elements, e.g., audio sensors 18, 20. In block 102, audio input signals are received from the audio sensors. Each sensor provides a separate audio signal, also referred to as an audio channel. Each audio signal represents sound received at a particular audio sensor. In block 104, the incoming audio signals are pre-conditioned. The pre-conditioning may include band-pass filtering each of the audio signals to reject interfering signals outside the frequency range of interest. For example, the audio signals may be filtered to remove signal outside the human audible range. The audio input signals may also be individually amplified to account for the difference in intrinsic sensitivity of the individual sensors. After this correction, the signal levels from the audio sensors should more accurately represent the signal strengths arriving at the audio sensors. The audio sensors can be calibrated during manufacturing of the audio input device to obtain the correct amplification factor. If pre-use estimation of the correction factor is not feasible, the audio sensors can be calibrated and the correction factor can also be estimated during operation of the audio input device through an automatic gain matching mechanism. The audio signals may be initially received from the sensors as analog signals and then converted into digital audio signals by an analog-to-digital (A/D) converter. The signal pre-conditioning described above can be performed on the analog audio signals, digitized audio signals, or in any suitable combination of the digital and analog processing domains.

Next, in block 106 the amplitude of each audio sensor signal is determined. Although different methods can be employed to determine the amplitudes of the audio signals, one method is to digitize each of the audio signals into a conventional digital audio format, such as PCM (pulse code modulation) audio, where the audio samples are in a time series. Then, the digitized incoming audio signals from each sensor are divided into audio frames of a predetermined length, e.g., 10 mS (milliseconds). Other suitable frame lengths may be used, such as 20 mS. The amplitude of each audio signal is then computed on a frame-by-frame basis. The amplitude of an audio signal in a frame is computed for each sensor as:

$$amp_k(n) = \Sigma_t |x_k(t)|^p \qquad \text{Eq. 1}$$

In Equation 1, amp(n) represents the audio signal amplitude of the nth frame, n is the frame index, $x_k(t)$ represents a digital audio sample at time t, k denotes the kth sensor, and t is the time index for the incoming audio signal samples. p is a pre-chosen parameter, that may have a value greater than one, for example, p may equal two. The summation is over all the audio samples in the frame. For each sensor, the audio signal amplitude $amp_k(n)$ may also be smoothed over successive frames using a smoothing function, such as:

$$amp\_sm_k(n) = \alpha \cdot amp_k(n) + (1-\alpha) \cdot amp\_sm_k(n-1) \qquad \text{Eq. 2}$$

In Equation 2, $amp\_sm_k(n)$ is the smoothed amplitude value of the nth frame, $amp\_sm_k(n-1)$ is the smoothed amplitude value of the (n−1)th frame, and α is a predefined weighting constant, preferably having a value less than one.

In addition, the smoothed frame amplitudes may optionally be converted to the log domain. The smoothed frame amplitudes may be converted to log domain according to Equation 3, below.

$$log\_amp\_sm_k(n) = \log(amp\_sm_k(n)) \qquad \text{Eq. 3}$$

In Equation 3, $log\_amp\_sm_k(n)$ is the log value of the smoothed amplitude value of the nth frame.

In block 108, the audio channel amplitudes are then compared on a frame-by-frame basis to find the difference between channel amplitudes. For example, for a sensor array with two elements (as shown in FIG. 1), the difference, diffAmp(n) can be computed as:

$$diffAmp(n) = log\_amp\_sm_1(n) - log\_amp\_sm_2(n) \qquad \text{Eq. 4}$$

In Equation 4, diffAmp(n) represents the difference between the channel amplitudes for the nth frame, for a first audio channel and a second audio channel. Alternatively, the amplitude difference can be computed without converting the amplitudes to the log domain by computing the difference between $amp\_sm_k(n)$ for the two channels.

In block 110, the proximity of the audio source is determined. To accomplish this, the amplitude difference between the audio channels is compared to a predefined threshold. For example, diffAmp(n) for Equation 4 is compared to a threshold. If diffAmp(n) is greater than the threshold for a predefined number of consecutive frames, a near-field flag is triggered to a set state. The set flag indicates that the audio sensors have detected an audio source that is in close proximity to the audio input device. This flag may stay on until diffAmp(n) falls below the threshold for a predefined number of consecutive frames. A noise reduction/suppression module of the audio input device may suppress the signal when the near-field flag is off, as the incoming audio signal is classified as far-field and thus treated as background noise.

As an alternative to the channel amplitude difference, a near_field_score for each frame may be computed from diffAmp(n) through the division by a predefined normalization factor, as given, for example, by Equation 5, below.

$$near\_field\_score(n) = \frac{diffAmp(n)}{norm\_factor} \qquad \text{Eq. 5}$$

The normalization factor, norm_factor, may be any suitable constant value or function.

The near_field_score(n) may further be converted to a probability value indicating the likelihood that the audio source is near-field. The conversion can be made using a non-linear function, such as a sigmoid function, for example, as given in Equation 6, below.

$$f(u) = \frac{1}{1 + \exp(-Au + B)} \qquad \text{Eq. 6}$$

In Equation 6, u is the near_field_score(n), f(u) represents the probability value, and A and B are constants. The amount suppression applied by the noise reduction/suppression module may then be made a function of the near_field_score(n), or alternatively, the near-field probability value, f(u). Using either the score or probability value f(u), the score or probability value is compared to a predefined threshold. If the score or f(u) is greater than the threshold for a predefined number of consecutive frames, a near-field flag is triggered to a set state. The set flag indicates that the audio sensors have detected an audio source that is in close proximity to the audio input device. This flag may stay on until the score or f(u) falls below the threshold for a predefined number of consecutive frames. Different threshold values can be used for the near_field_score and probability. A noise reduction/suppression module of the audio input device may suppress the signal when the near-field flag is off, as the incoming audio signal is classified as far-field and thus treated as background noise. Or alternatively, the amount of suppression is made a function of the near_field_score(n) or the near-field probability values, f(u). Typically, as the score or probability decreases, stronger suppression is applied.

Figure 5:
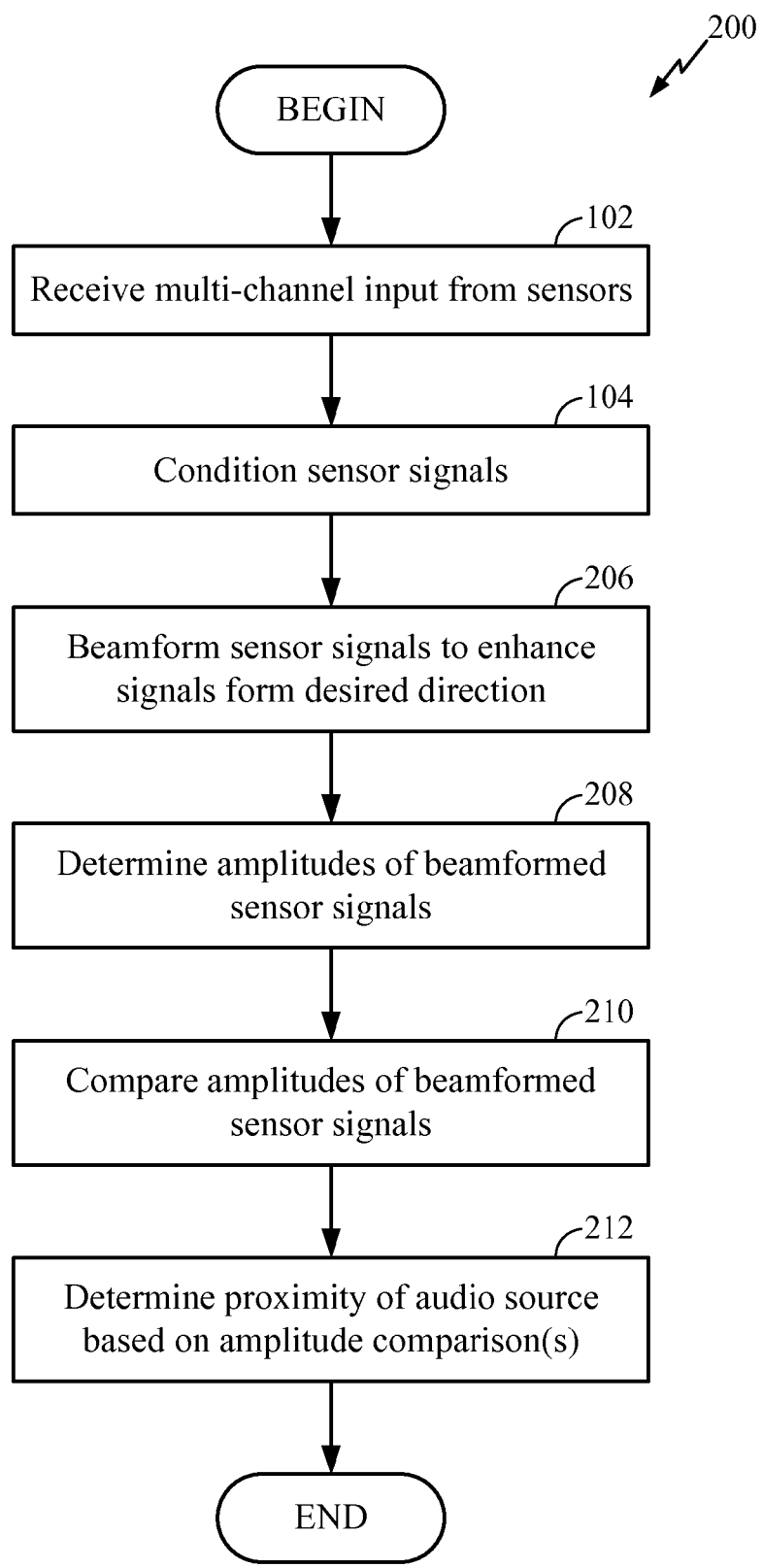
FIG. 5 is a flowchart illustrating a method of determining the proximity of an audio source using beam forming.

FIG. 5 is a flowchart 200 illustrating method of determining the proximity of an audio source using beamforming. The method begins by receiving multi-channel audio inputs from plural audio sensors and pre-conditioning the audio signals (blocks 102-104), as described above in connection with the method of FIG. 4.

Next, in block 206, beamforming is applied to the digitized audio channels to improve the accuracy of the proximity estimation. Instead of using the raw audio input signals, the audio input signals are passed through a beam-former to enhance audio signals received from a direction of interest, for example, from the frontal direction. The spatial selectivity of incoming audio is achieved by using adaptive or fixed receive beam patterns. Suitable beamforming techniques are readily available for application in the audio input devices disclosed herein. For example, the output of a beamformer, $y_k(t)$, is given by:

$$y_k(t) = \Sigma_k W_{kk'} \otimes x_{k'}(t) \qquad \text{Eq. 7}$$

In Equation 7, ⊗ denotes a convolution function, $W_{kk'}$ is a weighting factor, k indicates the kth audio sensor and k' indicates the k'th audio sensor and $x_{k'}(t)$ represents a digital audio sample from the k'th audio sensor at time t. The beamformed audio signals, $y_k(t)$, can then be processed in a manner similar to that described in blocks 106-110 of FIG. 4.

More specifically, in block 208, the amplitude of each beamformed audio sensor signal is determined. Although different methods can be employed to determine the amplitudes of the beamformed audio signals, one method is to digitize each of the audio signals into a conventional digital audio format, such as PCM (pulse code modulation) audio, where the audio samples are in a time series. Then, the digitized beamformed audio signals from each sensor are divided into of audio frames of a predetermined length, e.g., 10 mS. Other suitable frame lengths may be used, such as 20 mS. The amplitude of each beamformed audio signal is then computed on a frame-by-frame basis. The amplitude of a beamformed audio signal in a frame may be computed for each sensor using Equation 1, substituting $y_k(t)$ for $x_k(t)$.

For each sensor, the beamformed audio signal amplitude may also be smoothed over successive frames using a smoothing function, such as the smoothing function given by Equation 2. In addition, the smoothed frame amplitudes may optionally be converted to the log domain according to Equation 3.

In block 210, the beamformed audio channel amplitudes are then compared on a frame-by-frame basis to find the difference between channel amplitudes. For example, for a sensor array with two elements (as shown in FIG. 1), the beamformed amplitude difference can be determined according to Equation 4. Alternatively, the beamformed amplitude difference can be computed without converting the amplitudes to the log domain by computing the difference between $amp\_sm_k(n)$ for the two beamformed channels.

In block 212, the proximity of the audio source is determined. To accomplish this, the amplitude difference between the beamformed audio channels is compared to a predefined threshold. For example, diffAmp(n) of Equation 4 is compared to a threshold. If the diffAmp(n) is greater than the threshold for a predefined number of consecutive frames, a near-field flag is triggered to a set state. The set flag indicates that the audio sensors have detected an audio source that is in close proximity to the audio input device. This flag may stay on until diffAmp(n) falls below the threshold for a predefined number of consecutive frames. A noise reduction/suppression module of the audio input device may suppress the incoming audio signal when the near-field flag is off, as the incoming audio signal is classified as far-field and thus treated as background noise.

As an alternative to the beamformed channel amplitude difference, a near_field_score for each beamformed frame may be computed from diffAmp(n) through the division by a predefined normalization factor, as given, for example, by Equation 5.

The near_field_score(n) for the beamformed audio channels may further be converted to a probability value indicating the likelihood that the audio source is near-field. The conversion can be made using a non-linear function, such as a sigmoid function, for example, as given in Equation 6.

The amount suppression applied by the noise reduction/suppression module of a beamforming audio input device may then be made a function of the near_field_score(n), or alternatively, the near-field probability value. Using the score or probability value f(u), the score or probability value is compared to a predefined threshold. If the score or f(u) is greater than the threshold for a predefined number of consecutive frames, a near-field flag is triggered to a set state. The set flag indicates that the audio sensors have detected an audio source that is in close proximity to the audio input device. This flag may stay on until the score or f(u) falls below the threshold for a predefined number of consecutive frames. Different threshold values can be used for the score and probability value. A noise reduction/suppression module of the beamforming audio input device may suppress the signal when the near-field flag is off, as the incoming audio signal is classified as far-field and thus treated as background noise. Or alternatively, the amount of suppression is made a function of the near_field_score(n) or the near-field probability values, f(u). Typically, as the score or probability decreases, stronger suppression is applied.

Figure 6:
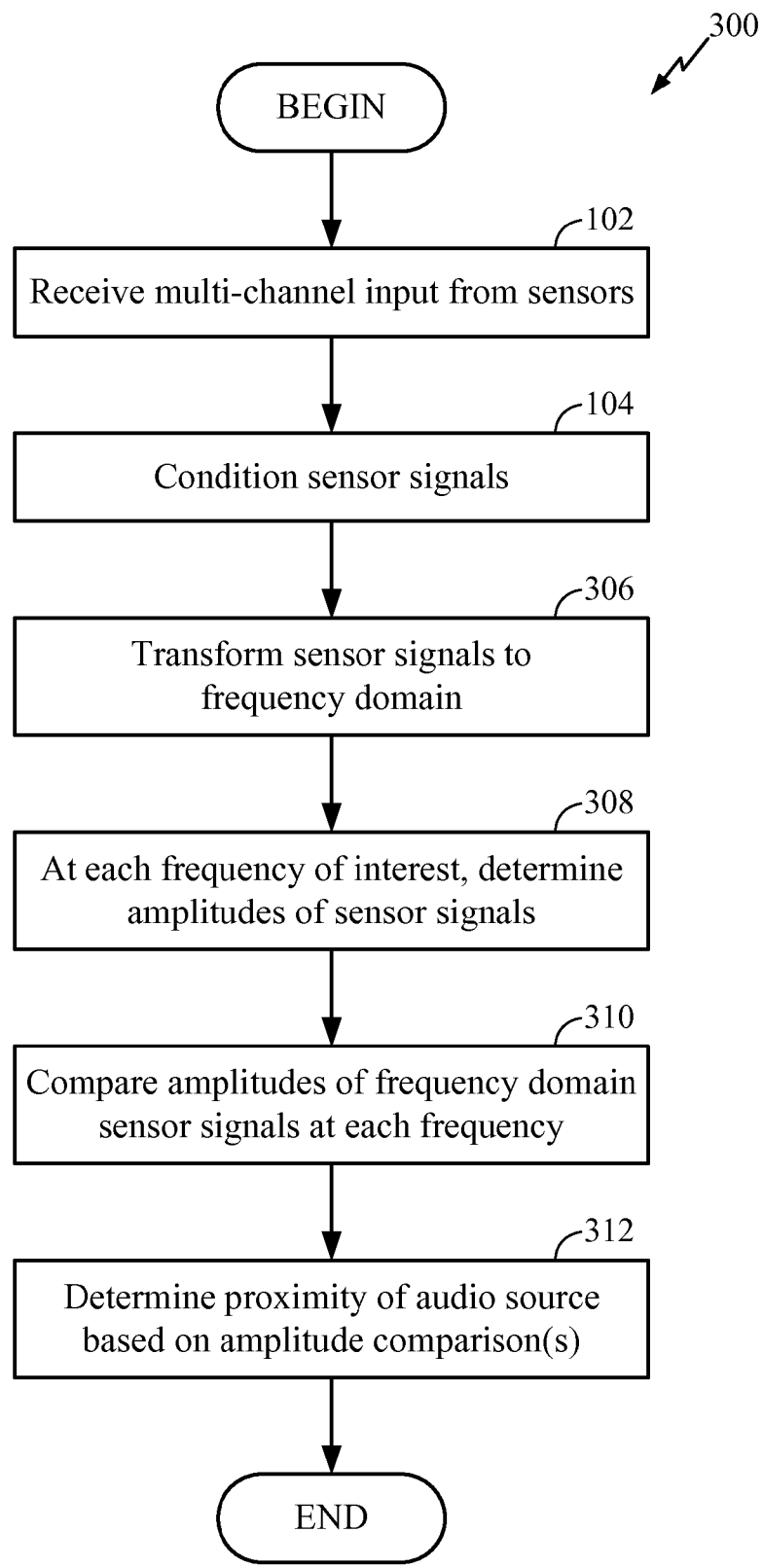
FIG. 6 is a flowchart illustrating a method of determining the proximity of an audio source by comparing spectral components of incoming audio.

FIG. 6 is a flowchart 300 illustrating a method of determining the proximity of an audio source by comparing frequency components of incoming audio. The method begins by receiving multi-channel audio inputs from plural audio sensors and pre-conditioning the audio signals (blocks 102-104), as described above in connection with the method of FIG. 4.

Next, in block 306, the sensor signals are transformed to the frequency domain. This transformation of each signal can be done using, for example, as fast Fourier transform (FFT), discrete Fourier transform (DFT), discrete cosine transform (DCT), wavelet transformation, or any other suitable transformation. Preferably, an FFT is used to convert the audio signals from the sensor to the frequency domain. One method for accomplishing the transformation is to digitize each of the audio signals into a conventional digital audio format, such as PCM (pulse code modulation) audio, where the audio samples are in a time series. Then, the digitized audio signals from each sensor are divided into a sequence of audio frames of a predetermined length, e.g., 10 mS (milliseconds). Other suitable frame lengths may be used, such as 20 mS. A frequency domain transform is then applied to the audio samples in each frame.

In block 308, at each frequency of interest, the amplitude of the transformed audio signals is determined. The frequency amplitudes of each transformed audio signal may be computed on a frame-by-frame basis, with the amplitude $amp_k(n, f)$ at a particular frequency, f, of the nth frame being obtained directly from the transform function. The range of frequencies of interest may be any desirable frequency spectrum, for example, the audible range of human hearing. Each frequency of interest in the range may be a particular frequency or bandwidth different from other frequencies or bandwidths of interest within the range. For example, the frequencies of interest may be spaced at regular intervals, e.g., 100 Hz, or spaced at non-regular intervals.

The frequency amplitudes may be smoothed according to Equation 2, at each frequency of interest to yield $amp\_sm_k(n, f)$, and optionally converted to the log domain using Equation 3 at each frequency of interest to yield $log\_amp\_sm_k(n,f)$, computed for each frequency f.

At block 310, at each frequency of interest, the amplitudes (e.g., magnitudes) of the transformed sensor signals are compared to one another. A diffAmp(n,f), near_field_score(n,f) may be computed at each frequency, f, according to Equations 4 and 5, respectively. For example, for a sensor array with two elements (as shown in FIG. 1), the frequency domain amplitude difference can be determined according to Equation 4. Alternatively, the frequency domain amplitude difference can be computed without converting the amplitudes to the log domain by computing the difference between $amp\_sm_k(n,f)$ for the two transformed channels. A near-field flag may also be computed separately for each frequency.

In block 312, the proximity of the audio source is determined. To accomplish this, the amplitude difference between the frequency-transformed audio channels is compared to a predefined threshold. For example, diffAmp(n,f) is compared to a threshold. If the diffAmp(n,f) is greater than the threshold for a predefined number of consecutive frames, a near-field flag for the frequency is triggered to a set state. The set flag indicates that the audio sensors have detected an audio source that is in close proximity to the audio input device. This flag may stay on until diffAmp(n,f) falls below the threshold for a predefined number of consecutive frames. A noise reduction/suppression module of the audio input device may suppress the incoming audio signal when the near-field flag is off, as the incoming audio signal is classified as far-field and thus treated as background noise.

As an alternative to the frequency-transformed channel amplitude difference, a near_field_score(n,f) at each frequency of interest in each transformed frame may be computed from diffAmp(n,f) through the division by a predefined normalization factor, as given, for example, by Equation 5.

The near_field_score(n,f) values for the frequency-transformed audio channels may further be converted to probability values, f(u,f), each probability value corresponding to one of the frequencies, indicating the likelihood that the audio source is near-field. The conversion can be made using a non-linear function, such as a sigmoid function, for example, as given in Equation 6.

Using the method of FIG. 6, different amounts of noise suppression may then be applied to different frequency components of the incoming audio signal during noise reduction. This frequency domain approach is beneficial when a desired near-field audio signal and far-field background noise at different frequency bands are present at the same audio frame.

For example, the amount suppression applied by the noise reduction/suppression module of a frequency domain audio input device may be made a function of the near_field_score (n,f), or alternatively, the near-field probability values, f(u,f). Using the scores or probability values, each score or probability value is compared to a predefined threshold. If the score or f(u,f) is greater than the threshold for a predefined number of consecutive frames, a near-field flag is triggered to a set state. The set flag indicates that the audio sensors have detected an audio source that is in close proximity to the audio input device for the particular frequency. This flag may stay on until the score or f(u,f) falls below the threshold for a predefined number of consecutive frames. Different threshold values may be used for the scores and probability values. A noise reduction/suppression module of the frequency domain audio input device may suppress the frequency component of the audio signal when the corresponding near-field flag is off, as the incoming audio signal is classified as far-field and thus treated as background noise at that frequency. Or alternatively, the amount of suppression is made a function of the near_field_score(n,f) or the near-field probability values, f(u,f). Typically, as the score or probability decreases, stronger suppression is applied.

The methods described in FIGS. 4-6 can be used individually or together in any suitable combination thereof to affect background noise suppression in an input audio device.

Figure 7:
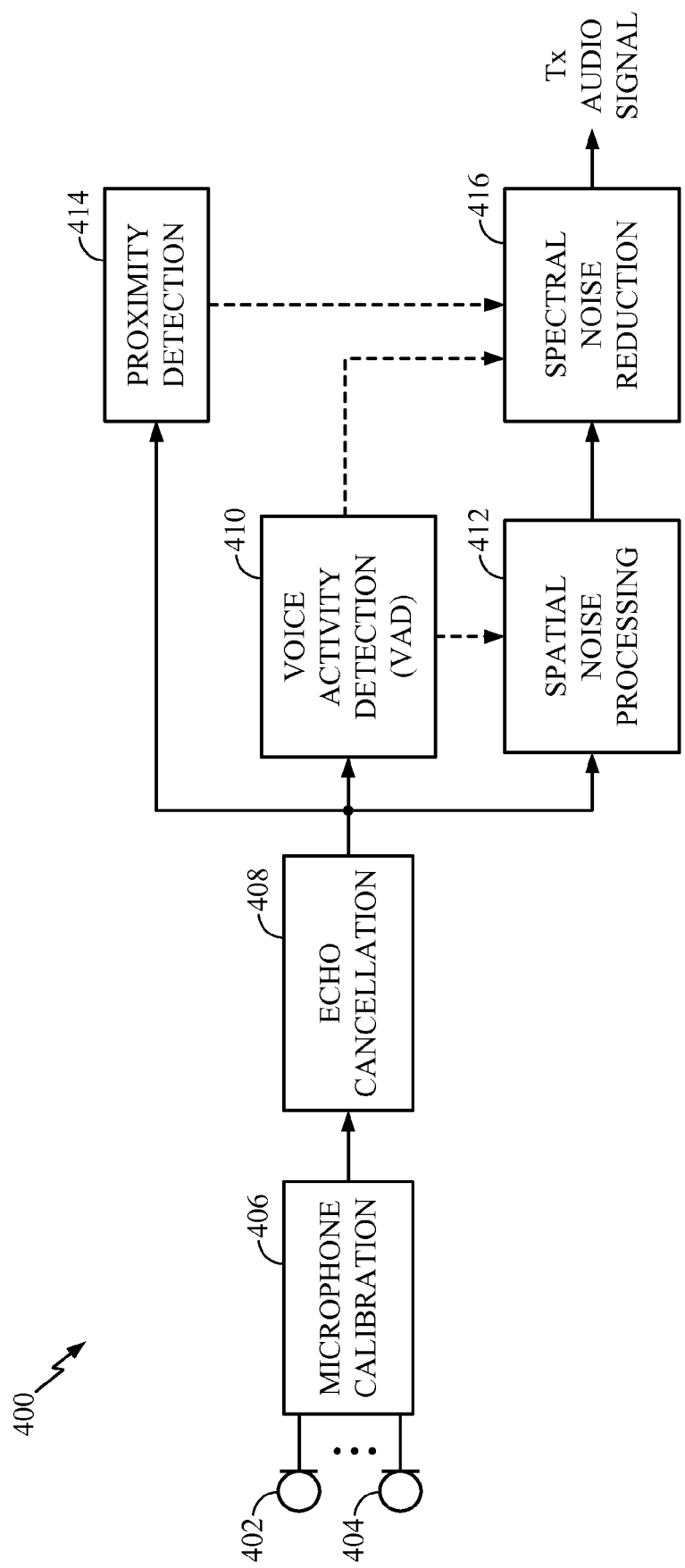
FIG. 7 is a process block diagram showing a process of spectral noise reduction.

FIG. 7 is a process block diagram showing an exemplary process 400 for spectral noise reduction in a voice processing device. The process 400 may be incorporated into an audio input device, such as the headset 16 of FIG. 1. Two or more audio sensors, such as microphones 402, 404, transduce incoming audio into electrical signals. The electrical signals can then be pre-conditioned, as described for example in block 104, digitized using an A/D converter (not shown) into a digital audio format such as PCM, and then formed into a sequence of digital audio frames, which are then received by a microphone calibration module 406. The microphone calibration module 406 balances the gains of the microphones 402, 404 to compensate for intrinsic differences in the sensitivities of the individual microphones 402, 404. After this correction, the signal levels from the microphones 402, 404 should more accurately represent the signal strengths actually arriving at the microphones 402, 404. The microphones 402, 404 can alternatively be calibrated during manufacture of the audio input device to obtain the correct amplification factor. If pre-use estimation of the correction factor is not feasible, the microphone calibration module 406 can calibrate the microphones 406 through the use of, for example, an automatic gain matching mechanism.

The audio signals output from the microphone calibration module 406 are provided to an echo cancellation module 408. The echo cancellation module 408 can employ conventional echo cancellation algorithms to remove echo from the incoming audio signals. The audio frames output from the echo cancellation module are then provided to a voice activity detection (VAD) module 410, a spatial noise processing module 412, and a proximity detection module 414.

The VAD module 410 detects the presence or absence of human speech (voice) in the frames of the incoming audio signals, and outputs one or more flags corresponding to the audio signals, indicating whether voice is currently present in the incoming audio received by the audio input device. The VAD algorithm used by the VAD module 410 can be, for example, any suitable VAD algorithm currently known to those skilled in the art. For example, an energy-based VAD algorithm may be used. This type of FAD algorithm computers signal energy and compares the signal energy level to a threshold to determine voice activity. A zero-crossing count type VAD algorithm may also be use. This type of VAD algorithm determines the presence of voice by counting the number of zero crossings per frame as an input audio signal fluctuates from positives to negatives and vice versa. A certain threshold of zero-crossings may be used to indicate voice activity, as well as VAD algorithms that compute formats and/or cepstral coefficient to indicate the presence of voice. Other VAD algorithms or any suitable combination of the above VAD algorithms may alternative/additionally be employed by the FAD module 410.

The proximity detection module 414 may employ any of the proximity detection methods described in connection with FIGS. 4-6 herein, or any suitable combination thereof, to determine the proximity of an audio source producing sound received by the audio input device. Preferably, the proximity detection method used is the frequency domain method described with reference to FIG. 6. The proximity detection module 414 outputs a near-field flag for each audio frame. Using the preferred frequency-domain proximity detection method, a near-field flag is output for each frequency of interest, per each audio frame.

The spatial noise processing module 412 suppresses audio noise in the time domain based on the output flag(s) of the VAD module 410. The audio frames processed are preferably those received from a predefined one of the microphones, e.g., the microphone closer to a user's mouth. If, for example, the VAD flag(s) indicate that an incoming audio frame does not include voice, the spatial noise processing module 412 suppresses the audio frame, otherwise the module 412 passes the audio frame unchanged to a spectral noise reduction (SNR) module 416.

The SNR module 416 suppresses background noise in the audio frame based on the VAD flag(s) and the near-field flag(s) received from the VAD module 410 and proximity detection module 414, respectively. If at least one of the VAD flags indicates that voice is contained in a frame, then the SNR module 416 checks to determine whether a near-field flag from the proximity detection module 414 indicates that the audio source is within close proximity to audio input device. If a VAD flag is not set, then the SNR module 416 is receiving a partially suppressed audio frame from the spatial noise processing module 412, and may perform further processing on the frame. If voice is present, the SNR module 416 transforms the audio frames into the frequency domain. The transformation can be done using any of the transforms described in connection with block 306 of FIG. 6. The SNR module 416 may use the near-field flags from the proximity detection module 414 for each frequency of interest. If the near-field flag is set for a particular frequency, then that frequency component of the frame is not suppressed. If the near-field flag is not set, then the corresponding frequency component of the audio frame is suppressed. Or alternatively, the amount of suppression is linked to the near_field_score(n,f) or the near-field probability values, f(u,f). Typically, as the score or probability decreases, stronger suppression is applied. After this processing takes place in the SNR module 416, the SNR module 416 transforms the processed audio frames back to the time domain using an inverse transform. The processed audio frames may then be output as a transmit (Tx) audio signal.

Figure 8:
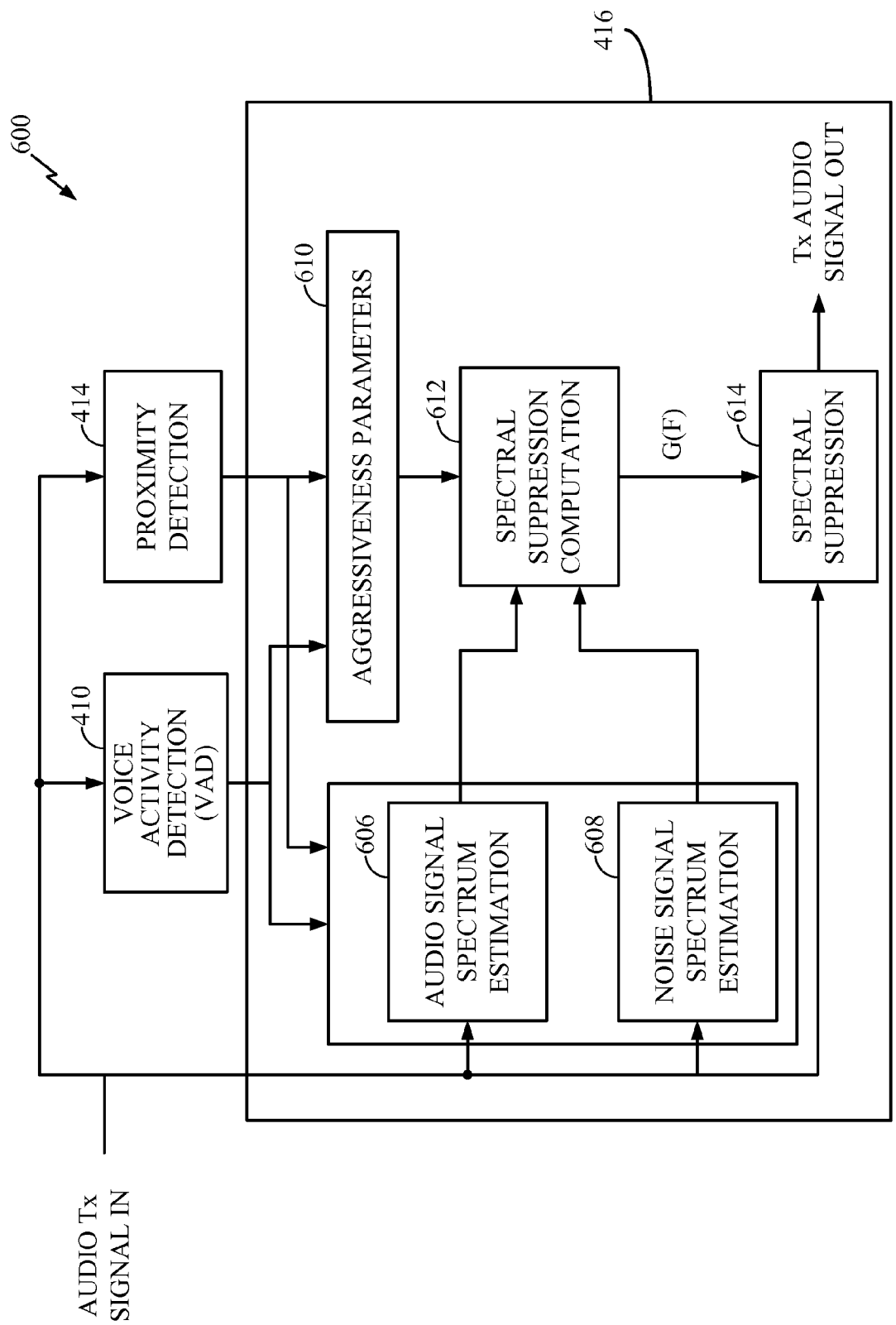
FIG. 8 is a more detailed process block diagram showing the process of spectral noise reduction.

FIG. 8 is a more detailed process block diagram showing a process 600 of spectral noise reduction that can be incorporated into the SNR module 416.

Typically, in a spectral suppression process, the incoming signal is divided into frames of 10 mS. The spectrum of each frame is computed (blocks 606, 608). A decision is made to decide if the given frame is the desired signal or not. This decision may be a soft one and done independently on each frequency in the spectrum. At the end of this spectrum computation and signal/noise decision, signal energy, $\sigma_{X(f)}^2$, and noise energy, $\sigma_{N(f)}^2$, for each frequency f are updated (blocks 606 and 608, respectively). The signal of current frame is typically attenuated if the current frame contains mostly noise. This is done by multiplying the current frame signal by a gain factor, G(f) (block 614). G(f) usually is a function of $\sigma_{X(f)}^2$ and $\sigma_{N(f)}^2$ with some parameters controlling the aggressiveness of attenuation. Below are two commonly used formulae to compute the gain factor:

$$G(f) = \max\left(1 - \frac{\alpha \sigma_{N(f)}^2}{\sigma_{X(f)}^2}, \varepsilon\right) \quad \text{Eq. 8}$$

$$G(f) = \max\left(\frac{\sigma_{X(f)}^2}{\sigma_{X(f)}^2 + \alpha \sigma_{N(f)}^2}, \varepsilon\right) \quad \text{Eq. 9}$$

Here α and ε are the aggressiveness parameters. Increasing α would make the attenuation more aggressive while increasing ε would make the attenuation less aggressiveness.

In a typical usage of an audio input device, desired voice would be coming from a close distance while signal from far away would usually be noise. Hence to reduce the background noise, it is desired to apply more attenuation when signal is detected to be coming from a distance. This can be done by making the G(f) a function of proximity detection output (block 414) and/or the VAD flag (block 410). In addition, both the VAD 410 and proximity detection 414 may control the audio and noise signal spectrum estimation, blocks 606 and 608, respectively. For example, when VAD is ON and the near-field flag is set, the input frame is used to update the audio signal spectrum, but not the noise spectrum.

In block 610, the aggressiveness parameters are determined. When signal is classified to be from far, G(f) is reduced by for example setting α to a high value and ε to a low value. When signal is classified to be from near, G(f) is increased by setting α to a low value and ε to a high value. The values α and ε can be made as a function of the near_field_score or probability value. Typically, α would decrease with the near_field_score (probability) and ε would increase with the near_field_score. When other forms of G(f) are used, it can be modified similarly following the principle that G(f) be reduced when the score or probability decreases. After the instantaneous G(f) is computed, the final gain factor is obtained by smoothing G(f) over the frequency axis and time direction (block 612).

Figure 9:
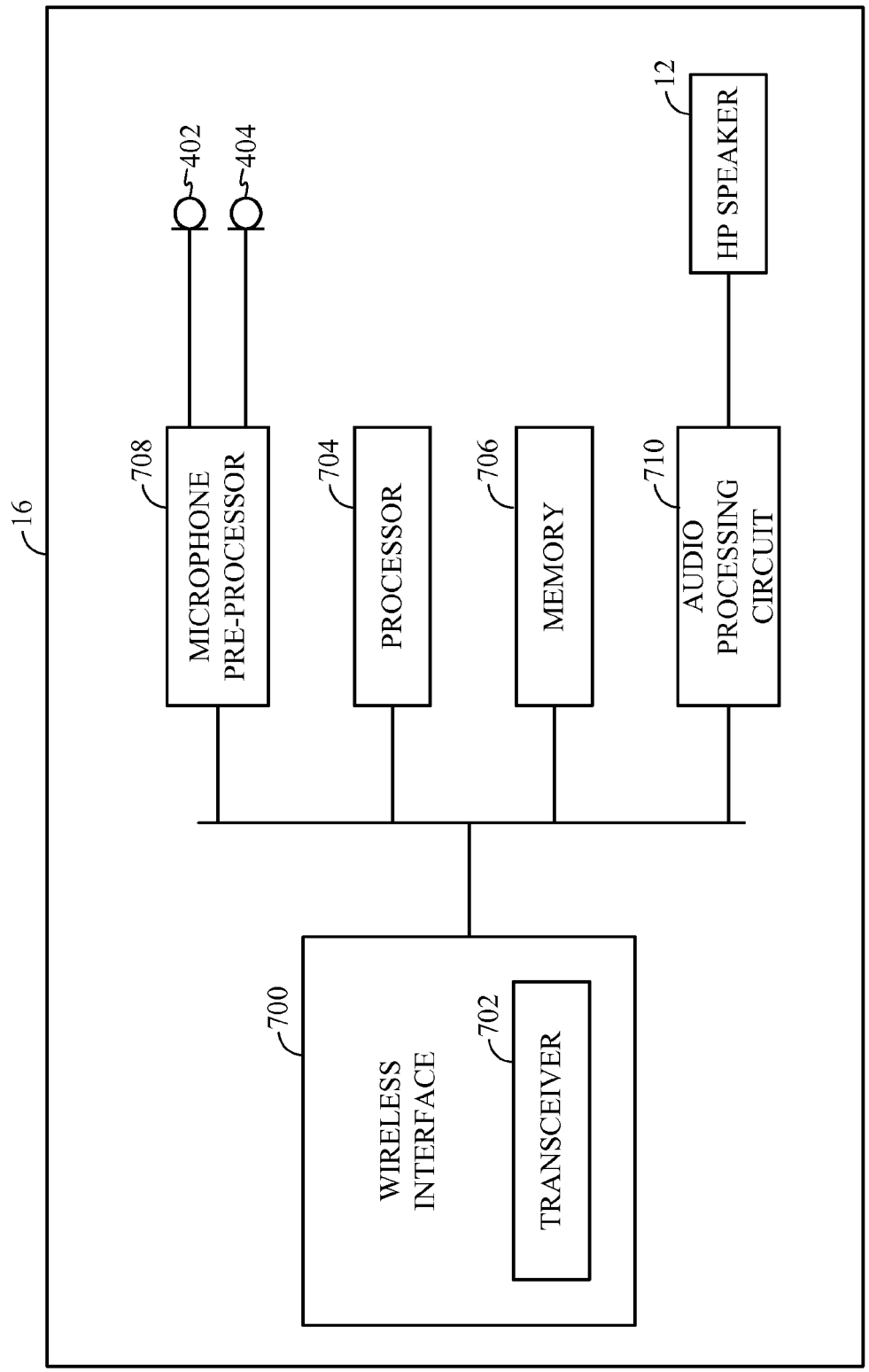
FIG. 9 is a block diagram showing certain components of an exemplary headset device having audio source proximity estimation capability.

FIG. 9 is a block diagram showing certain components of the exemplary headset 16. The headset 16 is configured to perform audio source proximity estimation and noise suppression, as described herein. The headset 16 includes a wireless interface 700, microphones 402, 404, a processor 704, a memory 706, a microphone pre-processing module 708, audio processing circuit 710, and at least one headphone (HP) speaker 711. The components 700-710 can be coupled together using a digital bus 713.

The processor 704 executes software or firmware that is stored in the memory 502 to provide the functionality of the blocks 406-416, and/or the proximity detection methods described in connection with FIGS. 4-6.

The processor 704 can be any suitable processor or controller, such as an ARM7, digital signal processor (DSP), one or more application specific integrated circuits (ASICs), field programmable gate arrays (FPGAs), complex programmable logic devices (CPLDs), discrete logic, or any suitable combination thereof. Alternatively, the processor 704 may include a multi-processor architecture having a plurality of processors, such as a microprocessor-DSP combination. In an exemplary multi-processor architecture, a DSP can be programmed to provide at least some of the audio processing disclosed herein, such as the functions described for blocks 406-416, and a microprocessor can be programmed to control overall operating of the audio input device.

The memory 502 and microprocessor 500 can be coupled together and communicate on a common bus, such as bus 713. The memory 502 and microprocessor 500 may be integrated onto a single chip, or they may be separate components or any suitable combination of integrated and discrete components. In addition, other processor-memory architectures may alternatively be used, such as a multiprocessor and/or multi memory arrangement.

The memory 502 may be any suitable memory device for storing programming code and/or data contents, such as a flash memory, RAM, ROM, PROM or the like, or any suitable combination of the foregoing types of memories. Separate memory devices can also be included in the headset 16.

The microphone preprocessor 708 is configured to process electronic signals received from the microphones 402, 404. The microphone preprocessor 708 may include an analog-to-digital converter (ADC), amplifiers, a noise reduction and echo cancellation circuit (NREC) responsive to the microphones 402, 404. The ADC converts analog signals from the microphones into digital signal that are then processed by the NREC. The NREC is employed to reduce undesirable audio artifacts for communications and voice control applications. The microphone preprocessor 708 may be implemented using commercially-available hardware, software, firmware, or any suitable combination thereof.

The audio processing circuit 710 includes digital circuitry and/or analog circuitry to additionally process the digitized audio signals that are being output to the headphone speaker(s) 711 after passing through the noise suppression processing of the headset 16. Digital-to-analog (D/A) conversion, filtering, amplification and other audio processing functions can be performed by the audio processing circuit 710.

The headphone speaker(s) 711 are any suitable audio transducer(s) for converting the electronic signals output from the audio processing circuit 710 into sound to be heard by a user.

The wireless interface 700 permits the headset 16 to wirelessly communicate with other devices, for example, a cellular phone or the like. The wireless interface 700 includes a transceiver 702. The wireless interface 700 provides two-way wireless communications with the handset and other devices, if needed. Preferably, the wireless interface 700 includes a commercially-available Bluetooth module that provides at least a Bluetooth core system consisting of a Bluetooth RF transceiver, baseband processor, protocol stack, as well as hardware and software interfaces for connecting the module to a controller, such as the processor 704, in the headset 16. Although any suitable wireless technology can be employed with the headset 16, the transceiver 700 is preferably a Bluetooth transceiver. The wireless interface 700 may be controlled by the headset controller (e.g., the processor 704).

An audio input device may have more than two audio sensors. In cases of three or more audio sensors being used, a near_field_score or probability value, either being referred to as a proximity score, may be computed for each possible pair of audio sensors. The individual pair scores can then be combined to give a final score. For example, if there are three audio sensors, namely 1 and 3, and score23 for audio sensors 2 and 3. A final score can be obtained by taking the average of the scores, or by taking maximum of the scores, or alternatively, by taking the average of the two largest scores among the three, and ignoring the other score. And again, G(f) would be reduced when this combined near_field_score is low.

Figure 10:
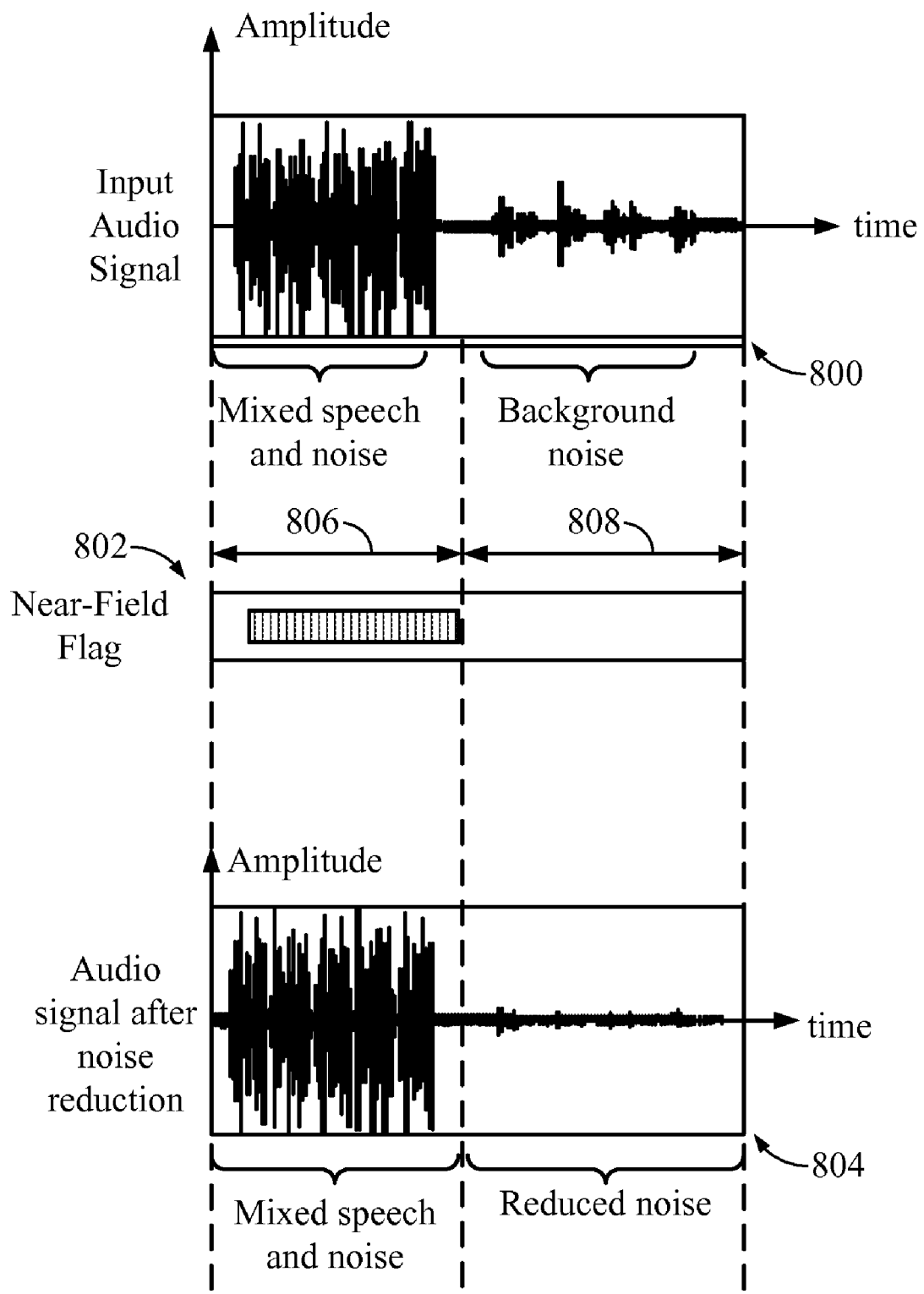
FIG. 10 shows graphs depicting exemplary background noise suppression.

An example of an audio signal processed in accordance with the techniques disclosed herein is shown in FIG. 10. FIG. 10 shows graphs 800, 802, 804 depicting exemplary background noise suppression. Graph 800 shows a trace of a raw input audio signal from an audio sensor. The graphs 800-804 cover a first time interval 806, when the audio signal comprises a mix of human speech and noise, and a second time interval 808, when the audio signal includes only background noise, without any speech. Graph 802 depicts the value of the near-field flag during the intervals 806, 808. The near-field flag can be generated by any of the audio source proximity detection methods described herein in connection with FIGS. 4-6. As shown in the example graph 802, the near-field flag is set during the first interval 806, when a near-field source, such as a human speaking, is detected. The flag is not set in the second interval 808, when only background noise from a distant audio source is present.

The graph 804 shows the output audio signal after noise suppression is applied according to the near-field flag. When the near-field flag is set in interval 806, no or limited noise suppression is applied to the audio signal. When the flag is not set in interval 808, the background noise, as shown in graph 800, is reduced by, for example the SNR module 416, to smaller levels, as shown in graph 804. In the last graph 804, the background noise is suppressed when the proximity information (e.g., near-field flag) corresponding to the audio signal is employed by a noise reduction module.

The principles disclosed herein may be applied to other devices, such as other wireless devices including cellular phones, PDAs, personal computers, stereo systems, video games and the like. Also, the principles disclosed herein may be applied to wired headsets, where the communications link between the headset and another device is a wire, rather than a wireless link. In addition, the various components and/or method steps/blocks may be implemented in arrangements other than those specifically disclosed without departing from the scope of the claims.

The functionality of the systems, devices, headsets and their respective components, as well as the method steps and blocks described herein may be implemented in hardware, software, firmware, or any suitable combination thereof. The software/firmware may be a program having sets of instructions (e.g., code segments) executable by one or more digital circuits, such as microprocessors, DSPs, embedded controllers, or intellectual property (IP) cores. If implemented in software/firmware, the functions may be stored on or transmitted over as instructions or code on one or more computer-readable media. Computer-readable medium includes both computer storage medium and communication medium, including any medium that facilitates transfer of a computer program from one place to another. A storage medium may be any available medium that can be accessed by a computer. By way of example, and not limitation, such computer-readable medium can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable medium.

Certain embodiments have been described. However, various modifications to these embodiments are possible, and the principles presented herein may thus be applied to other embodiments as well. Thus, other embodiments and modifications will occur readily to those of ordinary skill in the art in view of these teachings. Therefore, the following claims are intended to cover all such embodiments and modifications when viewed in conjunction with the above specification and accompanying drawings.

What is claimed is:

1. A method of determining proximity of an audio source, comprising:
   band-pass filtering a plurality of audio signals from a plurality of sensors;
   transforming the plurality of audio signals from the plurality of sensors to frequency domain;
   determining amplitudes of the transformed audio signals;
   comparing the amplitudes; and
   determining the proximity of the audio source based on the comparison of the amplitudes.

2. The method of claim 1, further comprising:
   beamforming each of the audio signals.

3. The method of claim 1, further comprising:
   beamforming each of the transformed audio signals.

4. The method of claim 1, further comprising:
   amplifying each of the audio signals by a respective correction factor.

5. The method of claim 1, wherein transforming includes applying an FFT, DCT, DFT, wavelet transformation, or any suitable combination of the foregoing transformations to the audio signals.

6. The method of claim 1, further comprising:
   dividing the audio signals into a plurality of frames;

determining an amplitude of each transformed audio signal for each of the frames, thereby producing the amplitudes;
smoothing the amplitudes over the frames;
comparing the smoothed amplitudes of the transformed audio signals to one another to produce at least one differential signal; and
determining the proximity of the audio source based on the differential signal.

7. The method of claim 6, further comprising:
normalizing the differential signal.

8. The method of claim 6, further comprising:
converting the smoothed amplitudes to a log domain.

9. The method of claim 6, further comprising:
applying a non-linear function to the differential signal to produce a proximity score.

10. The method of claim 9, wherein the non-linear function is a sigmoid function.

11. A method of determining proximity of an audio source, comprising:
receiving a plurality of audio signals from a plurality of sensors;
transforming the audio signals to frequency domain;
determining amplitudes of the transformed audio signals at a plurality of frequencies;
for each of the frequencies, determining a differential signal by comparing the amplitudes corresponding to the frequency, whereby determining a plurality of differential signals; and
determining the proximity of the audio source based on the differential signals.

12. The method of claim 11, further comprising:
Comparing the differential signal at each of the frequencies to a predetermined threshold; and
determining a near-field flag at each of the frequencies, based on the comparison of the differential signal and the predetermined threshold for the frequency.

13. The method of claim 11, further comprising:
dividing the audio signals into a plurality of frames; and
determining the amplitudes for each of the frames.

14. The method of claim 13, further comprising:
smoothing the amplitudes over the frames.

15. The method of claim 14, further comprising:
converting the smoothed amplitudes to a log domain.

16. The method of claim 11, further comprising:
normalizing the differential signals to determine a proximity score at each of the frequencies.

17. The method of claim 11, further comprising:
applying a non-linear function to the differential signals to produce a proximity score at each of the frequencies.

18. An apparatus, comprising:
a plurality of audio sensors outputting a plurality of audio signals in response to an audio source;
a proximity detection module configured to transform the audio signals to frequency domain and to determine the proximity of the audio source by comparing amplitudes of the transformed audio signals; and
a noise reduction/suppression module responsive to output from the proximity detection module, wherein the reduction/suppression module is configured to estimate an audio signal spectrum and a noise signal spectrum.

19. The apparatus of claim 18, wherein the apparatus is a headset.

20. The apparatus of claim 19, wherein the headset is a wireless headset.

21. The apparatus of claim 18, further comprising:
a microphone calibration module.

22. The apparatus of claim 18, further comprising:
a voice activity detection (VAD) module.

23. The apparatus of claim 18, further comprising:
an echo cancellation module.

24. An apparatus, comprising:
means for transforming a plurality of audio signals from a plurality of sensors to frequency domain;
means for determining amplitudes of the transformed audio signals;
means for comparing the amplitudes; and
means for determining the proximity of the audio source based on the comparison of the amplitudes; and
means for noise reduction/suppression responsive to the means for determining the proximity of the audio source, wherein the means for noise reduction/suppression is configured to estimate an audio signal spectrum and a noise signal spectrum.

25. A non-transitory computer-readable medium embodying a set of instructions executable by one or more processors, comprising:
code for transforming a plurality of audio signals from a plurality of sensors to frequency domain;
code for determining amplitudes of the transformed audio signals;
code for comparing the amplitudes;
code for determining the proximity of the audio source based on the comparison of the amplitudes;
code for noise reduction/suppression responsive to the code for determining the proximity of the audio source; and
code for estimating an audio signal spectrum and a noise signal spectrum.

26. The non-transitory computer-readable medium of claim 25, further comprising:
code for voice activity detection.

27. A method of determining proximity of an audio source, comprising:
receiving a plurality of audio signals from a plurality of sensors;
beamforming the audio signals;
determining amplitudes of the beamformed audio signals;
comparing the amplitudes; and
determining the proximity of the audio source based on the comparison of the amplitudes.

28. The method of claim 27, wherein determining comprising:
computing a near field score; and
determining the proximity of the audio source based on the near field score.

29. The method of claim 27, wherein determining comprising:
computing a near field probability value; and
determining the proximity of the audio source based on the near field probability value.

30. The method of claim 27, further comprising:
amplifying each of the audio signals by a respective correction factor.

31. The method of claim 27, further comprising:
dividing the audio signals into a plurality of frames;
determining an amplitude of each beamformed audio signal for each of the frames, whereby producing the amplitudes;
smoothing the amplitudes over the frames;
comparing the smoothed amplitudes of the beamformed audio signals to one another to produce at least one differential signal; and determining the proximity of the audio source based on the differential signal.

32. The method of claim 31, further comprising:

normalizing the differential signal.

33. The method of claim 31, further comprising:

applying a non-linear function to the differential signal to produce a proximity score.

* * * * *